(12) United States Patent
Kushida et al.

(10) Patent No.: US 8,575,277 B2
(45) Date of Patent: Nov. 5, 2013

(54) PROCESS FOR PRODUCTION OF NUCLEUS-HYDROGENATED AROMATIC VINYL/(METH)ACRYLATE COPOLYMERS

(75) Inventors: Yasuhiro Kushida, Niigata (JP); Yuuichi Sugano, Niigata (JP); Tatsuya Yamauchi, Niigata (JP); Hideyuki Sato, Niigata (JP); Yoshikazu Shima, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 803 days.

(21) Appl. No.: 12/672,152

(22) PCT Filed: Aug. 4, 2008

(86) PCT No.: PCT/JP2008/063961
§ 371 (c)(1),
(2), (4) Date: Feb. 4, 2010

(87) PCT Pub. No.: WO2009/020096
PCT Pub. Date: Feb. 12, 2009

(65) Prior Publication Data
US 2011/0269912 A1 Nov. 3, 2011

(30) Foreign Application Priority Data

Aug. 6, 2007 (JP) .................................. 2007-203815

(51) Int. Cl.
*C08F 8/04* (2006.01)
(52) U.S. Cl.
USPC ........................................................ 525/330.3
(58) Field of Classification Search
USPC ........................................................ 525/330.3
See application file for complete search history.

(56) References Cited

U.S. PATENT DOCUMENTS

| | | | |
|---|---|---|---|
| 4,629,767 A | 12/1986 | Shyr et al. | |
| 4,954,576 A | 9/1990 | Kubo et al. | |
| 5,028,665 A | 7/1991 | Hucul | |
| 5,654,253 A | 8/1997 | Hucul et al. | |
| 6,395,841 B1 | 5/2002 | Calverley et al. | |
| 6,417,287 B1 | 7/2002 | Wege et al. | |
| 6,420,491 B1 | 7/2002 | Wege et al. | |
| 6,509,510 B1 | 1/2003 | Wege et al. | |
| 2002/0107423 A1* | 8/2002 | Miyamoto et al. | 585/250 |
| 2006/0205886 A1 | 9/2006 | Yamauchi et al. | |
| 2007/0185277 A1* | 8/2007 | Sugano et al. | 525/310 |

FOREIGN PATENT DOCUMENTS

| | | |
|---|---|---|
| EP | 0 317 263 A2 | 5/1989 |
| JP | 01 132603 | 5/1989 |
| JP | 1 213306 | 8/1989 |
| JP | 03 076706 | 4/1991 |
| JP | 03 081301 | 4/1991 |
| JP | 04 075001 | 3/1992 |
| JP | 2725402 | 3/1998 |
| JP | 11 504959 | 5/1999 |
| JP | 2890748 | 5/1999 |
| JP | 2000 95815 | 4/2000 |
| JP | 3094555 | 10/2000 |
| JP | 2001 098017 | 4/2001 |
| JP | 3200057 | 8/2001 |
| JP | 2001 527095 | 12/2001 |
| JP | 2002 521508 | 7/2002 |
| JP | 2002 521509 | 7/2002 |
| JP | 2002 249515 | 9/2002 |
| JP | 2003 138078 | 5/2003 |
| JP | 2003 529646 | 10/2003 |
| JP | 2004 513190 | 4/2004 |
| JP | 2004 149549 | 5/2004 |
| JP | 2006 89713 | 4/2006 |
| JP | 2006 291184 | 10/2006 |
| JP | 2007 254733 | 10/2007 |
| NL | 274061 | 9/1964 |

OTHER PUBLICATIONS

Office Action issued on Jul. 29, 2011 in the corresponding Chinese Patent Application No. 200880100002.0.

* cited by examiner

*Primary Examiner* — Ling Choi
*Assistant Examiner* — Lanee Reuther
(74) *Attorney, Agent, or Firm* — Oblon, Spivak, McClelland, Maier & Neustadt, L.L.P.

(57) ABSTRACT

A safe and stable production method of a hydrogenated polymer having high transparency, which is a production method of a hydrogenated polymer by hydrogenating aromatic rings of an aromatic vinyl compound-(meth)acrylate copolymer, in which (1) a solvent solution of the copolymer is added to a reactor, which has a solvent and a supported palladium catalyst charged therein, under a hydrogen atmosphere at a rate of from 0.01 to 15 g/hour in terms of the copolymer per unit mass (g) of the supported palladium catalyst, thereby performing hydrogenation reaction, and then such an operation is performed repeatedly that (2) a hydrogenated polymer is obtained from 30 to 90% by mass of the resulting reaction mixed solution, and a fresh solvent solution of the copolymer is added to the reactor, in which the residual reaction mixed solution is left, or to which the residual reaction mixed solution is returned, at a rate of from 0.01 to 15 g/hour in terms of the copolymer per unit mass (g) of the supported palladium catalyst, thereby performing hydrogenation reaction.

19 Claims, No Drawings

PROCESS FOR PRODUCTION OF NUCLEUS-HYDROGENATED AROMATIC VINYL/(METH)ACRYLATE COPOLYMERS

TECHNICAL FIELD

The present invention relates to a production method of a hydrogenated polymer by hydrogenation (nuclear hydrogenation) of aromatic rings of an aromatic vinyl compound-(meth)acrylate copolymer in the presence of a supported palladium catalyst.

BACKGROUND ART

In recent years, amorphous plastics including an acrylic resin, a methacrylic resin, a styrene resin, a polycarbonate resin and a cyclic polyolefin resin are being applied to various purposes, and there are large demands for optical materials, such as an optical lens and an optical disk substrate, owing to the optical characteristics thereof. Optical materials of the kinds requires not only high transparency, but also high performance that is well balanced among high heat resistance, low water absorbing property, mechanical properties and the like.

The materials having been conventionally used do not satisfy all the requirement but have problems to be solved. For example, polystyrene has problems of mechanical brittleness, large birefringence and deteriorated transparency. Polycarbonate has large birefringence and has transparency equivalent to polystyrene although it is excellent in heat resistance. Polymethyl methacrylate has high transparency, but is considerably high in water absorbance, which provides problems of poor dimensional stability and low heat resistance. Polyvinylcyclohexane, which is obtained by nuclear hydrogenation of polystyrene, is excellent in transparency, but has problems of low mechanical strength, poor heat resistant stability and poor adhesion property to other materials (see Patent Documents 1 to 3). A method of improving the adhesion includes a method of mixing nuclear-hydrogenated polystyrene, a product obtained by hydrogenating a double bond and an aromatic ring of a conjugated diene-polystyrene, or a saturated hydrocarbon resin (see Patent Document 4), but the method includes complicated operations. Such a method is disclosed that an aromatic vinyl compound, such as styrene, and an unsaturated dibasic acid, such as maleic anhydride, are copolymerized, and 30% or more of the aromatic rings are nuclear-hydrogenated (see Patent Document 5), but the transparency and birefringence thereof are improved as compared to polystyrene, but the optical characteristics are inferior to an acrylic resin. A copolymer of methyl methacrylate (which is hereinafter referred to as MMA) and styrene (which is hereinafter referred to as an MS resin) has high transparency and is excellent in balance among dimensional stability, rigidity, specific gravity and the like, but has a problem of large birefringence. It has been confirmed that a resin obtained by nuclear-hydrogenating an MS resin (which is hereinafter referred to as MSH) is excellent in balance among low birefringence, low water absorbing property, transparency, heat resistance, mechanical properties, weather resistance, light resistance and the like (see Patent Document 6).

Nuclear hydrogenation of an aromatic polymer has been known (see Patent Document 7). It is considered that the nuclear hydrogenation rate is necessarily increased for providing a resin having high transparency, and a highly transparent resin cannot be obtained unless the nuclear hydrogenation rate is substantially 100%. This is because a low nuclear hydrogenation rate provides a block polymer, which impairs the total light transmittance. Not only hydrogenation of an aromatic polymer but hydrogenation of such a polymer as a conjugated diene polymer has been numerously known, and a metal, such as Pd, Pt, Rh, Ru, Re and Ni, supported on a carrier, such as activated carbon, aluminum oxide, silica and diatom earth, is mainly employed. However, it has been known that the reaction is difficultly performed due to the high molecular weight, a high nuclear hydrogenation rate and a large reaction speed are difficultly obtained, and the catalyst activity is liable to be lowered upon repeated reaction. For avoiding the drawbacks, the catalyst carrier is regulated in kind, fine pore structure and particle diameter. For example, a method of providing nuclear-hydrogenated polystyrene having a nuclear hydrogenation rate of approximately 70% by using a supported palladium catalyst supported on a silica carrier of less than 100 μm (see Patent Document 1), and a method of providing nuclear-hydrogenated polystyrene with a platinum catalyst or a rhodium catalyst supported on a silica carrier having large pores exceeding 600 Å (see Patent Document 8) have been known. Such a method has been similarly known that a catalyst, which is obtained by supporting a Group VIII metal on a porous carrier having fine pores of 450 Å occupying 95% or more of the pore volume with the metal surface area thereof being 75% or less of the carrier surface area, is used, the hydrogenation rate of the aromatic moiety is suppressed to a low value, and the ethylenic unsaturated moiety is hydrogenated at a high hydrogenation rate (see Patent Document 9).

There are a literature disclosing that polystyrene is completely hydrogenated without decrease in molecular weight in the case where a Group VIII metal supported on silica or aluminum oxide has a pore volume for a pore diameter of from 100 to 1,000 Å of from 70 to 25% of the total pore volume (see Patent Document 10), and a literature disclosing that polystyrene is completely hydrogenated without decrease in molecular weight by using a commercially available hydrogenated catalyst for a low molecular weight compound, which is supported on an aluminum oxide carrier and has a pore volume for a pore diameter of from 100 to 1,000 Å of less than 15%, in the presence of an ether oxygen-containing hydrocarbon (see Patent Document 11). Furthermore, hydrogenation reaction of a conjugated diene system, such as an acrylonitrile-butadiene copolymer, is performed with a metallic catalyst of an oxide of a Group IVa element, such as titania and zirconium oxide, thereby providing high activity upon repeated use, but it is limited to a conjugated diene system, and there is no mention with respect to hydrogenation of an aromatic compound (see Patent Document 12). Such a method is disclosed that unsaturated bonds including aromatic rings of an aromatic compound-conjugated diene polymer can be efficiently hydrogenated, and elution of the metallic components is suppressed, with a catalyst obtained in a manner that an alkali metal or an alkaline earth metal is added to a carrier having a large fine pore volume, in which a pore volume for a pore diameter of from 100 to 100,000 nm occupies from 50 to 100% of the total pore volume, and then 90% or more of a platinum group component is supported on the surface layer within 1/10 from the outer surface in the depth direction based on the diameter of the carrier (see Patent Document 13).

A method of improving the reactivity by reacting the polymerization reaction solution as it is after removing the catalyst poison with activated alumina (see Patent Document 14), and a method of improving the reaction linear velocity in the fixed layer for enhancing the productivity (see Patent Document 15) are also disclosed.

The nuclear hydrogenation reaction in polymer reaction is largely influenced by a solvent, and in general, a hydrocarbon, an alcohol, an ether, an ester and the like are used as a reaction solvent (see Patent Document 16). However, there are problems that a hydrocarbon and an alcohol have a low resin solubility, and among ether compounds, for example, 1,4-dioxane has a low ignition point, and tetrahydrofuran is unstable since it is liable to undergo ring-opening reaction. An ester is safe and relatively stable and performs reaction rapidly, but has a problem of white turbidity of the resin depending on the nuclear hydrogenation rate. A method of providing a nuclear-hydrogenated aromatic polymer with high transparency safely, stably and rapidly by adding an alcohol to an ester is disclosed accordingly, but the combination use of two solvent systems makes separation operation complicated. A method of maintaining high transparency with a low nuclear hydrogenation rate by adding an alcohol or water to an ester solvent is disclosed (see Patent Document 17), but the method often cannot be employed since the cause thereof is not clear, and the application range thereof is limited.

[Patent Document 1] Japanese Patent No. 3,094,555
[Patent Document 2] JP-A-2004-149549
[Patent Document 3] JP-A-2003-138078
[Patent Document 4] Japanese Patent No. 2,725,402
[Patent Document 5] JP-B-7-94496
[Patent Document 6] JP-A-2006-89713
[Patent Document 7] West German Patent No. 1,131,885
[Patent Document 8] JP-T-11-504959
[Patent Document 9] Japanese Patent No. 3,200,057
[Patent Document 10] JP-T-2002-521509
[Patent Document 11] JP-T-2002-521508
[Patent Document 12] JP-A-1-213306
[Patent Document 13] JP-A-2000-95815
[Patent Document 14] JP-T-2003-529646
[Patent Document 15] JP-A-2002-249515
[Patent Document 16] JP-T-2001-527095
[Patent Document 17] Japanese Patent No. 2,890,748

DISCLOSURE OF THE INVENTION

Problems to be Solved by the Invention

There are many problems on providing a hydrogenated aromatic polymer having high optical characteristics as mentioned above. In particular, a polymer obtained by hydrogenating aromatic rings of a copolymer of an aromatic vinyl compound and (meth)acrylate has such excellent characteristics as high transparency, low birefringence, high heat resistance, high surface hardness, low water absorbing property, low specific gravity and the like, but a useful method of providing stably the hydrogenated polymer with high transparency safely and quickly over a prolonged period of time has not yet been obtained.

Accordingly, the present invention is to provide a production method of a nuclear-hydrogenated aromatic vinyl compound-(meth)acrylate copolymer with high transparency safely and stably over a prolonged period of time.

Means for Solving the Problems

As a result of earnest investigations made by the inventors for attaining the object, it has been found that a hydrogenated polymer having such excellent characteristics as high transparency, low birefringence, high heat resistance, high surface hardness, low water absorbing property, low specific gravity and the like can be repeatedly obtained safely and stably over a prolonged period of time by performing, in a production method of a hydrogenated polymer by hydrogenating aromatic rings of an aromatic vinyl compound-(meth)acrylate copolymer, such an operation that (1) a solvent solution of the copolymer is added to a reactor, which has a solvent and a supported palladium catalyst charged therein, under a hydrogen atmosphere to make a feeding rate of the copolymer within a prescribed range, thereby performing hydrogenation reaction, and then (2) a hydrogenated polymer is obtained from 30 to 90% by mass of the resulting reaction mixed solution, and a fresh solvent solution of the copolymer is added to the reactor, in which the residual reaction mixed solution is left, or to which the residual reaction mixed solution is returned, at a constant feeding rate, and thus the present invention has been completed.

Accordingly, the present invention includes:

(1) a production method of a hydrogenated polymer by hydrogenating aromatic rings of an aromatic vinyl compound-(meth)acrylate copolymer, in which (1) a solvent solution of the copolymer is added to a reactor, which has a solvent and a supported palladium catalyst charged therein, under a hydrogen atmosphere at a rate of from 0.01 to 15 g/hour in terms of the copolymer per unit mass (g) of the supported palladium catalyst, thereby performing hydrogenation reaction, and then such an operation is performed repeatedly that (2) a hydrogenated polymer is obtained from 30 to 90% by mass of the resulting reaction mixed solution, and a fresh solvent solution of the copolymer is added to the reactor, in which the residual reaction mixed solution is left, or to which the residual reaction mixed solution is returned, at a rate of from 0.01 to 15 g/hour in terms of the copolymer per unit mass (g) of the supported palladium catalyst, thereby performing hydrogenation reaction, (2) the production method of a hydrogenated polymer according to the item (1), wherein the hydrogenation is performed at a reaction temperature of from 150 to 250° C. and a hydrogen pressure of from 5 to 15 MPa, (3) the production method of a hydrogenated polymer according to the item (1) or (2), wherein a total concentration of the copolymer and the hydrogenated polymer at the time when the addition of the solvent solution of the copolymer is finished is from 1 to 40% by mass, (4) the production method of a hydrogenated polymer according to any one of the items (1) to (3), wherein after finishing the addition of the solvent solution of the copolymer, the reaction mixed solution is stirred for from 0.1 to 24 hours, (5) the production method of a hydrogenated polymer according to any one of the items (1) to (4), wherein in constitutional units of the copolymer, a molar ratio of a constitutional unit derived from the (meth)acrylate is from 0.25 to 4 based on a constitutional unit derived from the aromatic vinyl compound, (6) the production method of a hydrogenated polymer according to any one of the items (1) to (5), wherein the copolymer has a weight average molecular weight of from 10,000 to 1,000,000, (7) the production method of a hydrogenated polymer according to any one of the items (1) to (6), wherein a hydrogenation rate of aromatic rings is 70% or more, (8) the production method of a hydrogenated polymer according to any one of the items (1) to (7), wherein the aromatic vinyl compound is styrene, and the (meth)acrylate contains from 80 to 100% by mol of methyl methacrylate and from 0 to 20% by mol of an alkyl acrylate, (9) the production method of a hydrogenated polymer according to any one of the items (1) to (8), wherein a carrier of the supported palladium catalyst is zirconium oxide and/or aluminum oxide,

(10) the production method of a hydrogenated polymer according to any one of the items (1) to (9), wherein the supported palladium catalyst has a palladium content of from 0.01 to 5% by mass,

(11) the production method of a hydrogenated polymer according to any one of the items (1) to (10), wherein the solvent is a carboxylate ester,

(12) the production method of a hydrogenated polymer according to any one of the items (1) to (11), wherein the reaction mixed solution obtained in the operation (1) is taken out from the reactor, at which the supported palladium catalyst is separated and left in the reaction system,

(13) a hydrogenated polymer obtained by the production method according to any one of the items (1) to (12), and

(14) an optical material composition containing the hydrogenated polymer according to the item (13).

Advantages of the Invention

According to the method of the present invention, a nuclear-hydrogenated aromatic vinyl compound-(meth)acrylate copolymer (hydrogenated polymer) having high transparency can be produced safely and stably over a prolonged period of time. Furthermore, the nuclear-hydrogenated aromatic vinyl compound-(meth)acrylate copolymer obtained by the present invention exhibits high transparency, low birefringence, high heat resistance, high surface hardness, low water absorbing property, low specific gravity, high transferring property and excellent mold releasing property. In particular, it has excellent characteristics as an optical material and can be applied to a wide range of purposes, such as an optical lens, a light guide plate, a light diffusion plate, a material for an optical disk substrate and a front panel.

BEST MODE FOR CARRYING OUT THE INVENTION

The present invention relates to a production method of a hydrogenated polymer by hydrogenating aromatic rings of an aromatic vinyl compound-(meth)acrylate copolymer as described above.

Monomer Components

Examples of the aromatic vinyl compound used in the present invention include styrene; an alkylstyrene (in which the carbon number of the alkyl moiety is preferably from 1 to 5), such as α-methylstyrene, α-ethylstyrene, o-methylstyrene, m-methylstyrene, p-methylstyrene, 1,3-dimethylstyrene and p-tert-butylstyrene; p-hydroxystyrene; an alkoxysyyrene (in which the carbon number of the alkoxy moiety is preferably from to 5), such as p-methoxystyrene, m-butoxystyrene and p-butoxystyrene; a halogenated styrene, such as o-chlorostyrene, m-chlorostyrene, p-chlorostyrene, 2,4-dichlorostyrene and 2,6-dichlorostyrene; vinylnaphthalene; and vinylanthracene. Among these, styrene is preferred.

Examples of the (meth)acrylate used in the present invention include an alkyl(meth)acrylate ester (in which the carbon number of the alkyl moiety is preferably from 1 to 20, more preferably from 1 to 10, and further preferably from 1 to 5), such as methyl(meth)acrylate, ethyl(meth)acrylate, butyl(meth)acrylate, dodecyl(meth)acrylate and octadecyl(meth)acrylate; a cycloalkyl or cyclic saturated hydrocarbon (meth)acrylate ester (in which the carbon number for forming the ring is preferably from 5 to 20, and more preferably from 5 to 10), such as cyclohexyl(meth)acrylate and isobornyl(meth)acrylate; a hydroxyalkyl(meth)acrylate ester (in which the carbon number of the alkyl moiety is preferably from 1 to 20, more preferably from 1 to 10, and further preferably from 1 to 5), such as 2-hydroxyethyl(meth)acrylate, 2-hydroxypropyl(meth)acrylate and 2-hydroxy-2-methylpropyl(meth)acrylate; an alkoxyalkyl(meth)acrylate ester (in which the carbon number of the alkyl moiety is preferably from 1 to 20, more preferably from 1 to 10, and further preferably from 1 to 5, and the carbon number of the alkoxy moiety is preferably from 1 to 10, more preferably from 1 to 5, and further preferably from 1 or 2), such as 2-methoxyethyl(meth)acrylate and 2-ethoxyethyl(meth)acrylate; a phenyl(meth)acrylate ester, such as phenyl(meth)acrylate; an arylalkyl(meth)acrylate ester (in which the carbon number of the aryl moiety is preferably from 6 to 10, and the carbon number of the alkyl moiety is preferably from 1 to 5), such as benzyl (meth)acrylate; and a (meth)acrylate ester having a phospholipid structure, such as 2-(meth)acryloyloxyethylphosphoryl choline. Only one kind of the (meth)acrylate may be used solely, or two or more kinds thereof may be used in combination.

Among these, it is preferred to use from 80 to 100% by mol of alkyl methacrylate and from 0 to 20% by mol of an alkyl acrylate in combination from the standpoint of balance among transparency, birefringence, heat resistance, surface hardness, water absorption property, specific gravity, transferring property and mold releasing property. In this case, the alkyl methacrylate is preferably methyl methacrylate, and the alkyl acrylate is preferably methyl acrylate or ethyl acrylate. As the (meth)acrylate, it is particularly preferred to use methyl methacrylate solely.

In combination with the aromatic vinyl compound and the (meth)acrylate, other monomer component may be used. Examples of the other monomer component include an N-alkylmaleimide (in which the carbon number of the alkyl moiety is preferably from 1 to 5), such as N-methylmaleimide, N-ethylmaleimide, N-propylmaleimide and N-butylmaleimide; an N-cycloalkylmaleimide (in which the carbon number for forming the ring is preferably from 5 to 10), such as N-cyclohexylmaleimide; an N-(alkyl)arylmaleimide (in which the carbon number for forming the ring is preferably from 6 to 10), such as N-phenylmaleimide and N-methylphenylmaleimide; an N-alkoxymaleimide (in which the carbon number of the alkoxy moiety is preferably from 1 to 5), such as N-methoxymaleimide; and an N-carboxyarylmaleimide (in which the carbon number for forming the ring is preferably from 6 to 10), such as N-carboxyphenylmaleimide.

The amount of the other monomer component used is preferably from 0 to 10 parts by mass, and more preferably from 0 to 5 parts by mass, based on the total monomer components.

Production Method of Aromatic Vinyl Compound-(Meth)acrylate Copolymer

The method of copolymerizing the monomer components containing the aromatic vinyl compound and the (meth)acrylate is not particularly limited. A known polymerization method, such as a radical polymerization method, an ionic polymerization method and a coordination polymerization method, may be used, and a radical polymerization method is industrially preferred owing to the simplicity thereof. The radical polymerization method may be appropriately selected from known polymerization methods, such as a bulk polymerization method, a solution polymerization method, an emulsion polymerization method and a suspension polymerization method. For example, examples of the bulk polymerization method and the solution polymerization method include a continuous polymerization method, in which a monomer composition containing the monomer components, a chain transfer agent and a polymerization initiator (and further contains a solvent in the case of the solution polymerization method) is continuously fed to a complete mixing bath and polymerized at a temperature of from 100 to 180° C. Examples of the solvent used in the solution polymerization method include a hydrocarbon solvent, such as toluene, xylene, cyclohexane and methylcyclohexane; an ester solvent, such as ethyl acetate; a ketone solvent, such as acetone and methyl ethyl ketone; an ether solvent, such as tetrahydrofuran and 1,4-dioxane; and an alcohol solvent, such as methanol and isopropanol. The reaction mixed solution after completing the polymerization is taken out from the complete mixing bath and introduced to a devolatilizing extruder or a depressurizing devolatilizing bath for devolatilizing the volatile components (such as the monomer components and the solvent), thereby providing the aromatic vinyl compound-(meth)acrylate copolymer (which may be hereinafter referred simply to as a copolymer).

In the constitutional units of the copolymer, the molar ratio (A/B) of the constitutional unit derived from the (meth)acrylate (A mol) to the constitutional unit derived from the aromatic vinyl compound (B mol) is preferably from 0.25 to 4, and more preferably from 0.5 to 2, from the standpoint of the mechanical strength and increase of the glass transition temperature due to the hydrogenation reaction of the copolymer.

The proportions of the constitutional units of the copolymer agree with the compositional ratios of the charged monomer components when the polymerization degree is 100%, but the copolymer is often produced actually with a polymerization degree of from 50 to 80%, and the composition of the constitutional units of the copolymer deviates from the charged composition of the monomer components since a monomer component having high reactivity is preferentially introduced into the polymer. Accordingly, it is necessary to adjust appropriately the compositional ratios of the monomer components charged.

The weight average molecular weight of the copolymer thus obtained is preferably from 10,000 to 1,000,000, more preferably from 50,000 to 700,000, further preferably from 100,000 to 500,000, and particularly preferably from 130,000 to 250,000. A copolymer having a weight average molecular weight of less than 10,000 or larger than 1,000,000 can be nuclear-hydrogenated by the method of the present invention, but a copolymer having a weight average molecular weight within the range is preferred since it has sufficient mechanical strength for practical use and has appropriate viscosity for facilitating handleability. In the present specification, the weight average molecular weight is a value obtained by gel permeation chromatography (GPC) in terms of polystyrene conversion with tetrahydrofuran as a solvent.

Hydrogenation Method of Aromatic Ring of Aromatic Vinyl Compound-(Meth)acrylate Copolymer In the present invention, the following operations (1) and (2) are performed upon hydrogenating the copolymer obtained above, whereby a nuclear-hydrogenated aromatic vinyl compound-(meth)acrylate copolymer (hydrogenated polymer) having high transparency can be produced safely and stably over a prolonged period of time.

(1) A solvent solution of the copolymer is added to a reactor, which has a solvent and a supported palladium catalyst charged therein, under a hydrogen atmosphere at a rate of from 0.01 to 15 g/hour in terms of the copolymer per unit mass (g) of the supported palladium catalyst, thereby performing hydrogenation reaction.

(2) Such an operation is performed repeatedly that a hydrogenated polymer is obtained from 30 to 90% by mass of the resulting reaction mixed solution, and a fresh solvent solution of the copolymer is added to the reactor, in which the residual reaction mixed solution is left, or to which the residual reaction mixed solution is returned, at a rate of from 0.01 to 15 g/hour in terms of the copolymer per unit mass (g) of the supported palladium catalyst, thereby performing hydrogenation reaction.

Operation (1)

A supported palladium catalyst is used for the hydrogenation reaction from the standpoint of reaction speed.

The precursor for palladium is not particularly limited, and a known zerovalent or divalent palladium compound, such as palladium chloride, palladium nitrate, palladium acetate, tris (dibenzylideneacetone)dipalladium and tetrakis(triphenylphosphine)palladium, may be used.

Examples of the catalyst carrier include activated carbon, aluminum oxide ($Al_2O_3$), silica ($SiO_2$), silica-alumina ($SiO_2$—$Al_2O_3$), diatom earth, titania and zirconium oxide. Among these, zirconium oxide and aluminum oxide are preferred from the standpoint of reaction speed and nuclear hydrogenation rate, and zirconium oxide is more preferred from the standpoint that the hydrogenation reaction is performed homogeneously to enhance the transparency of the hydrogenated polymer. The expression that the aromatic rings in the polymer are homogeneously hydrogenated means that in a polymer having a molecular weight distribution, both a polymer component having a high molecular weight and a polymer component having a low molecular weight have the similar nuclear hydrogenation rate.

In the case where zirconium oxide or aluminum oxide is used as the catalyst carrier, such a characteristic feature is obtained that reduction of the activity of the supported palladium catalyst is considerably small upon repeated use thereof. The catalyst carrier preferably contains a large number of pores of from 20 to 3,000 Å and preferably has a specific surface area of 10 $m^2$/g or more, from the standpoint of dispersity and hydrogenation capability of the supported palladium. The particle diameter of the carrier of the supported palladium catalyst is generally from 0.1 to 1,000 μm, preferably from 1 to 500 μm, and more preferably from 5 to 200 μm. When the particle diameter is in the range, the supported palladium catalyst after the hydrogenation reaction can be easily separated, and a sufficient reaction speed can be obtained.

The preparation method of the supported palladium catalyst is not particularly limited, and for example, a palladium precursor, such as palladium acetate, is dissolved in an organic solvent, such as acetone, acetonitrile or 1,4-dioxane, with which the catalyst carrier is impregnated, and then the solvent component is evaporated, followed by drying and baking, thereby providing a catalyst having palladium supported with high dispersity. The catalyst can be prepared from a hydrochloric acid aqueous solution or sodium chloride aqueous solution of palladium chloride, or an aqueous solution or hydrochloric acid aqueous solution of palladium nitrate, and can also be prepared from a hydrochloric acid aqueous solution or an organic acid solution of palladium acetate.

The content of palladium in the supported palladium catalyst is generally in a range of from 0.01 to 50% by mass, preferably from 0.01 to 20% by mass, more preferably from 0.1 to 5% by mass, and particularly preferably from 0.1 to 1% by mass. In the case where zirconium oxide or aluminum oxide is used as a catalyst carrier, in particular, palladium can be supported with high dispersity, and the reaction speed per unit palladium is significantly large, whereby the supported amount of palladium, which is expensive, can be lowered. As a method of measuring the dispersity of palladium, a known method, such as a pulse adsorption method of carbon monoxide, may be employed.

As a solvent used in the hydrogenation reaction, such a one is preferred that is good in solubility of the copolymer and solubility of hydrogen before and after the hydrogenation reaction and has no moiety capable of being hydrogenated, and such a one that performs the reaction quickly may be selected. Upon assuming devolatilization of the solvent after the reaction, it is important that the solvent has a high ignition point. A carboxylate ester compound is preferred from that standpoint.

Preferred examples of the carboxylate ester compound include an aliphatic carboxylate ester represented by the following general formula (I):

$$R^1COOR^2 \quad (I)$$

In the general formula (I), $R^1$ represents an alkyl group having from 1 to 6 carbon atoms, such as a methyl group, an ethyl group, a n-propyl group, an isopropyl group, a n-butyl group, a n-pentyl group and a n-hexyl group. $R^2$ represents an alkyl group having from 1 to 4 carbon atoms, such as a methyl group, an ethyl group, a n-propyl group and a n-butyl group.

Specific examples of the aliphatic carboxylate ester represented by the general formula (I) include methyl acetate, ethyl acetate, n-butyl acetate, pentyl acetate, methyl propionate, ethyl propionate, n-propyl propionate, n-butyl propionate, methyl n-butyrate, methyl isobutyrate, n-butyl n-butyrate, methyl n-valerate and methyl n-hexanoate, and in particular, methyl acetate, ethyl acetate, methyl propionate, methyl isobutyrate and methyl n-butyrate are preferred, with methyl isobutyrate being more preferred.

The hydrogenation reaction in the present invention is performed by using a solvent solution containing the copolymer dissolved in the solvent (which is hereinafter referred to as a raw material solution). The concentration of the copolymer in the raw material solution is preferably from 1 to 50% by mass, more preferably from 1 to 40% by mass, further preferably from 3 to 30% by mass, and particularly preferably from 5 to 20% by mass. When the concentration is in the range, high productivity is obtained, the catalyst activity can be maintained for a prolonged period of time, and the hydrogenation reaction is performed homogeneously, which brings about a tendency of enhancing the transparency of the hydrogenated polymer. When the aromatic rings in the polymer are homogeneously hydrogenated, such an advantage is obtained that a high total light transmittance is liable to be obtained even though the nuclear hydrogenation rate is low in some extent.

The hydrogenation reaction is preferably performed with a suspended bed from the standpoint of contact efficiency between the copolymer and the supported catalyst. The reactor is preferably a stirred tank type reactor.

The hydrogen pressure in the hydrogenation reaction is preferably from 3 to 30 MPa, and more preferably from 5 to 15 MPa. The reaction temperature is preferably from 50 to 250° C., more preferably from 100 to 250° C., and further preferably from 150 to 250° C.

When the hydrogen pressure is in the range, a sufficiently high reaction speed can be obtained, and a high pressure-resistant reaction vessel is not necessarily used, which are economically preferred. When the reaction temperature is in the range, a sufficiently high reaction speed can be obtained, and decomposition of the polymer is difficult to occur.

In the present invention, the feeding rate of the raw material solution to the reactor is necessarily from 0.01 to 15 g/hour (preferably from 0.1 to 10 g/hour, more preferably from 0.5 to 10 g/hour, and further preferably from 0.5 to 5 g/hour) in terms of the copolymer per unit mass (g) of the supported palladium catalyst. A rate of less than 0.01 g/hour requires a prolonged time for feeding the copolymer to lower the productivity. A rate exceeding 15 g/hour fails to perform the hydrogenation reaction homogeneously to lower the transparency of the hydrogenated polymer, and quickly lowers the catalyst activity to fail to perform the reaction stably for a long time.

The retention time of the copolymer in the reactor is from 0.1 to 24 hours, and preferably from 1 to 20 hours. When the retention time is in the range, excellent productivity is obtained, and the hydrogenation reaction of the copolymer is performed homogeneously.

Operation (2)

In the present invention, after performing the hydrogenation reaction according to the aforementioned manner, only from 30 to 90% by mass (preferably from 50 to 90% by mass, and more preferably from 65 to 85% by mass) of the resulting reaction mixed solution is taken out from the reactor (however, except for the supported palladium catalyst), or the total reaction mixed solution including the supported palladium catalyst is taken out therefrom, and a hydrogenated polymer is separated and obtained only from 30 to 90% by mass (preferably from 50 to 90% by mass, and more preferably from 65 to 85% by mass) thereof (however, except for the supported palladium catalyst). Thereafter, the residual reaction mixed solution is left in the reactor (or is returned along with the supported palladium catalyst to the reactor), and a fresh raw material solution is fed to the reactor at the aforementioned feeding rate. The operation is repeatedly performed to enable industrial production of a hydrogenated polymer that has such characteristics as high transparency, high heat resistance, high surface hardness, low water absorbing property and low specific gravity over a prolonged period of time.

In this operation, the total concentration of the copolymer and the hydrogenated polymer in the reaction mixed solution is preferably maintained at from 1 to 50% by mass, more preferably from 1 to 40% by mass, further preferably from 3 to 30% by mass, and particularly preferably from 5 to 20% by mass. When the concentrations of the copolymer and the hydrogenated polymer in the reaction mixed solution are too large, the reaction speed is decreased and the solution viscosity is increased, which bring about a tendency of deterioration in handleability, and it becomes difficult to provide a hydrogenated polymer with homogeneity and high nuclear hydrogenation rate. When the concentrations are too small, there is a tendency of deterioration in productivity and economical efficiency. When the total concentration of the copolymer and the hydrogenated polymer in the reaction mixed solution is in the range, reduction of the catalyst activity is small even though the reaction is repeatedly performed, whereby a hydrogenated polymer that has such characteristics as high transparency, low birefringence, high heat resistance, high surface hardness, low water absorbing property and low specific gravity can be provided safely and stably over a prolonged period of time.

In the operation (2), the reaction mixed solution taken out from the reactor preferably has a residual amount of the supported palladium catalyst that is decreased to 10 ppm or less, and more preferably 1 ppm or less, by a known method, such as filtration and centrifugal separation from the standpoint of influence on coloration and mechanical properties. The supported catalyst is preferably removed under a non-oxidative atmosphere, such as a nitrogen gas atmosphere, from the standpoint of preventing the catalyst metallic component from being eluted.

The method of separating the hydrogenated polymer from the reaction mixed solution having been taken out from the reactor in the operation (2) is not particularly limited, and such methods may be employed as (1) a method, in which the supported catalyst is appropriately separated from the reaction mixed solution thus taken out, the solution is concentrated, and the polymer obtained is extruded in a molten state from an extruder for forming pellets, (2) a method, in which the supported catalyst is appropriately separated from the reaction mixed solution thus taken out, and the solvent is sufficiently evaporated to provide a bulk product, which is then formed into pellets, (3) a method, in which the supported catalyst is appropriately separated from the reaction mixed solution thus taken out, and a precipitate is obtained by mixing a poor solvent therewith and is formed into pellets, and (4) a method, in which the supported catalyst is appropriately separated from the reaction mixed solution thus taken out, and the solution is made in contact with hot water to provide a bulk product, which is then formed into pellets.

In the case where the hydrogenated polymer obtained in the present invention has a low nuclear hydrogenation rate, a block polymer is formed to impair the total light transmittance, and therefore, a high nuclear hydrogenation rate is demanded for providing a polymer having high transparency. Furthermore, a polymer having stable quality is necessarily produced from the industrial standpoint, and therefore, the nuclear hydrogenation rate is desirably maintained constant in production of the hydrogenated polymer over a prolonged period of time.

According to the present invention, even when the operation (2) is repeatedly performed, a hydrogenated polymer having a nuclear hydrogenation rate of 70% or more can be obtained, and depending on conditions, a hydrogenated polymer having a nuclear hydrogenation rate of 80% or more, 90% or more, and furthermore 95% or more, can be obtained. More specifically, according to the present invention, even when the operation (2) is performed 10 times, a nuclear hydrogenation rate of 80% or more, and 90% or more depending on conditions, can be obtained.

A hydrogenated polymer obtained by the method of the present invention favorably transmits light in the visible region and maintains transparent appearance even when the operation (2) is performed 10 times or more, and furthermore 14 times. A molded product thereof having a thickness of 3.2 mm has an excellent total light transmittance (measured by a method determined in JIS K7105) of 90% or more (specifically, from 91 to 92%) even when the operation (2) is performed 10 times or more, and furthermore 14 times. A total light transmittance of that level indicates that the aromatic rings in the polymer are homogeneously hydrogenated, and the polymer is suitable for an optical material purpose.

A hydrogenated polymer obtained by the method of the present invention is mixed appropriately, for example, with an additive, such as an antioxidant, a colorant, a mold releasing agent, a surfactant and an antibacterial agent, to form an optical material composition. The resulting optical material composition has thermoplastic property, and an optical article can be produced precisely and economically by various kinds of heat molding, such as extrusion molding, injection molding and secondary molding of a sheet-molded article.

Specific examples of purposes of the optical article include various kinds of a light guide plate and a light guide body, a display front panel, a plastic lens substrate, an optical filter, an optical film, a lighting shade and a lighted signboard.

EXAMPLE

The present invention will be described more specifically with reference to examples below, but the present invention is not particularly limited by the examples. The evaluation methods are shown below.

Measurement of Dispersity of Metallic Palladium

The dispersity of metallic palladium was measured by a pulse adsorption method of carbon monoxide. It was calculated with carbon monoxide/metallic palladium=1.

Measurement of Hydrogenation Rate of Hydrogenated Polymer

The nuclear hydrogenation rate was evaluated with an absorption reduction rate at 260 nm on UV spectrum measurements before and after the hydrogenation.

Measurement of Total Light Transmittance of Hydrogenated Polymer

The total light transmittance was measured by a transmission method with a flat plate having a thickness of 3.2 mm by using a chroma and turbidity measuring apparatus "COH-300A" (produced by Nippon Denshoku Industries Co., Ltd.) according to JIS K7105.

The heat-molded article as the specimen was obtained in such a manner that the hydrogenated polymer obtained in each of examples was dried at 80° C. under reduced pressure for 4 hours, then placed in a mirror-finished mold, and subjected to press heat molding at 210° C. and 10 MPa by using a hydraulic molding machine available from Toho Press Manufacturing Co., Ltd.

Example 1

Preparation of Supported Palladium Catalyst 0.0527 g (0.235 mmol) of palladium acetate was dissolved in 30 g of acetone, and 4.975 g of a dried zirconium oxide carrier "NNC-100" (a trade name, produced by Daiichi Kigenso Kagaku Kogyo Co., Ltd.) was added thereto and impregnated therewith at 40° C. under stirring. After distilling off acetone at 60° C. under reduced pressure, the mixture was dried at 120° C. for 4 hours and further baked at 400° C. for 3 hours to prepare a $Pd/ZrO_2$ catalyst having a palladium content of 0.5% by mass. The resulting supported catalyst had a dispersity of metallic palladium of 64%.

Nuclear Hydrogenation Reaction (1) 25 g of methyl isobutyrate (which is hereinafter referred to as MIB) and 0.5 g of the 0.5% by mass $Pd/ZrO_2$ catalyst were charged in a 200-mL autoclave, which was increased in pressure and temperature to a hydrogen pressure of 9 MPa and a temperature of 200° C. Thereafter, while maintaining a hydrogen pressure of 9 MPa and a temperature of 200° C., 75 g of a raw material solution (a 10% by mass MS600-MIB solution), which was obtained by dissolving 7.5 g of a copolymer "MS600" (a trade name, MMA/styrene=6/4, weight average molecular weight: 170,000, produced by Nippon Steel Chemical Co., Ltd.) containing methyl methacrylate (MMA) and styrene in 67.5 g of MIB, was fed to the autoclave at a rate of 3.0 g/hour in terms of the copolymer per unit mass (g) of the supported catalyst. After completing the feeding operation, the solution was stirred for further 15 hours.

(2) After completing the reaction, the temperature and the pressure of the system were decreased, and 75 g of the reaction mixed solution (except for the supported catalyst), which corresponded to 75% by mass of the total solution, was taken out through a filter in a reaction vessel and added dropwise into an excessive amount of methanol, followed by recovering the hydrogenated polymer. The resulting hydrogenated polymer had a nuclear hydrogenation rate of 99.5%.

Subsequently, the autoclave was again increased in pressure and temperature to a hydrogen pressure of 9 MPa and a temperature of 200° C., and similar to the above manner, 75 g of the raw material solution (i.e., the 10% by mass MS600-MIB solution) was fed to the autoclave at a rate of 3.0 g/hour in terms of the copolymer per unit mass (g) of the supported catalyst, and after completing the feeding operation, the solution was stirred for further 15 hours.

The operation (2) was performed repeatedly 14 times in total similar to the above manner. The nuclear hydrogenation rate in the 14th operation was 91.1%. No elution of palladium was found (0.01 ppm or less) in the reaction solutions in the operations.

Heat-molded articles of the resulting hydrogenated polymers each had a total light transmittance of 92%.

The results are shown in Table 1.

TABLE 1

| Repetition number | Nuclear hydrogenation rate (%) |
|---|---|
| 0 | 99.5 |
| 1 | 99.7 |
| 2 | 99.1 |
| 3 | 98.4 |
| 4 | 97.2 |
| 5 | 96.2 |
| 6 | 95.5 |
| 7 | 95.2 |
| 8 | 95.0 |
| 9 | 94.4 |
| 10 | 93.9 |
| 11 | 93.1 |
| 12 | 92.5 |
| 13 | 91.8 |
| 14 | 91.1 |

Example 2

The experiment was performed in the same manner as in Example 1 except that the feeding rate of the raw material solution of 3.0 g/hour in terms of the copolymer per unit mass (g) of the supported catalyst in Example 1 was changed to 10 g/hour.

The results obtained upon performing the operation (2) repeatedly 14 times in total are shown in Table 2.

No elution of palladium was found (0.01 ppm or less) in the reaction solutions in the operations. Heat-molded articles of the resulting hydrogenated polymers each had a total light transmittance of from 91 to 92%.

TABLE 2

| Repetition number | Nuclear hydrogenation rate (%) |
|---|---|
| 0 | 99.5 |
| 1 | 99.6 |
| 2 | 99.1 |
| 3 | 98.3 |
| 4 | 97.0 |
| 5 | 96.0 |
| 6 | 95.1 |
| 7 | 94.2 |
| 8 | 93.0 |
| 9 | 91.9 |
| 10 | 91.2 |
| 11 | 90.1 |
| 12 | 89.0 |

TABLE 2-continued

| Repetition number | Nuclear hydrogenation rate (%) |
|---|---|
| 13 | 87.8 |
| 14 | 86.6 |

Comparative Example 1

The experiment was performed in the same manner as in Example 1 except that the feeding rate of the raw material solution of 3.0 g/hour in terms of the copolymer per unit mass (g) of the supported catalyst in Example 1 was changed to 90 g/hour.

The results obtained upon performing the operation (2) repeatedly 8 times in total are shown in Table 3. A heat-molded articles of the hydrogenated polymers obtained in the 8th operation had a total light transmittance decreased to 84%.

TABLE 3

| Repetition number | Nuclear hydrogenation rate (%) |
|---|---|
| 0 | 97.1 |
| 1 | 92.9 |
| 2 | 88.7 |
| 3 | 83.9 |
| 4 | 79.8 |
| 5 | 75.5 |
| 6 | 71.0 |
| 7 | 67.3 |
| 8 | 64.5 |

Comparative Example 2

The experiment was performed in the same manner as in Example 1 except that the feeding rate of the raw material solution of 3.0 g/hour in terms of the copolymer per unit mass (g) of the supported catalyst in Example 1 was changed to 20 g/hour.

The results obtained upon performing the operation (2) repeatedly 9 times in total are shown in Table 4. A heat-molded articles of the hydrogenated polymers obtained in the 9th operation had a total light transmittance decreased to 84%.

TABLE 4

| Repetition number | Nuclear hydrogenation rate (%) |
|---|---|
| 0 | 99.5 |
| 1 | 99.0 |
| 2 | 97.5 |
| 3 | 94.2 |
| 4 | 91.0 |
| 5 | 85.3 |
| 6 | 80.9 |
| 7 | 74.3 |
| 8 | 70.5 |
| 9 | 65.8 |

Comparative Example 3

Preparation of Supported Palladium Catalyst

A Pd/ZrO$_2$ catalyst having a palladium content of 0.5% by mass was prepared in the same manner as in Example 1. The resulting supported catalyst had a dispersity of metallic palladium of 64%.

Nuclear Hydrogenation Reaction (1) 25 g of methyl isobutyrate (which is hereinafter referred to as MIB) and 0.5 g of the 0.5% by mass Pd/ZrO$_2$ catalyst were charged in a 200-mL autoclave, which was increased in pressure and temperature to a hydrogen pressure of 9 MPa and a temperature of 200° C. Thereafter, while maintaining a hydrogen pressure of 9 MPa and a temperature of 200° C., 75 g of a raw material solution (a 10% by mass MS600-MIB solution), which was obtained by dissolving 7.5 g of a copolymer "MS600" (a trade name, MMA/styrene=6/4, weight average molecular weight: 170,000, produced by Nippon Steel Chemical Co., Ltd.) containing methyl methacrylate (MMA) and styrene in 67.5 g of MIB, was fed to the autoclave at a rate of 3.0 g/hour in terms of the copolymer per unit mass (g) of the supported catalyst. After completing the feeding operation, the solution was stirred for further 15 hours.

(2) After completing the reaction, the temperature and the pressure of the system were decreased, and 100 g of the reaction mixed solution (except for the supported catalyst), which corresponded to 100% by mass of the total solution, was taken out through a filter in a reaction vessel and added dropwise into an excessive amount of methanol, followed by recovering the hydrogenated polymer. The resulting hydrogenated polymer had a nuclear hydrogenation rate of 99.5%.

Subsequently, after feeding 25 g of MIB to the autoclave, the autoclave was again increased in pressure and temperature to a hydrogen pressure of 9 MPa and a temperature of 200° C., and similar to the above manner, 75 g of the raw material solution (i.e., the 10% by mass MS600-MIB solution) was fed to the autoclave at a rate of 3.0 g/hour in terms of the copolymer per unit mass (g) of the supported catalyst, and after completing the feeding operation, the solution was stirred for further 15 hours.

The results obtained upon performing the operation (2) repeatedly twice in total in the similar manner as above are shown in Table 5.

No elution of palladium was found (0.01 ppm or less) in the reaction solutions in the operations.

Heat-molded articles of the resulting hydrogenated polymers each had a total light transmittance of from 91 to 92%.

TABLE 5

| Repetition number | Nuclear hydrogenation rate (%) |
|---|---|
| 0 | 99.5 |
| 1 | 93.5 |
| 2 | 90.2 |

Example 3

Preparation of Supported Palladium Catalyst 0.0105 g (0.047 mmol) of palladium acetate was dissolved in 30 g of acetone, and 4.995 g of a dried zirconium oxide carrier "NNC-100" (a trade name, produced by Daiichi Kigenso Kagaku Kogyo Co., Ltd.) was added thereto and impregnated therewith at 40° C. under stirring. After distilling off acetone at 60° C. under reduced pressure, the mixture was dried at 120° C. for 4 hours and further baked at 400° C. for 3 hours to prepare a Pd/ZrO$_2$ catalyst having a palladium content of 0.1% by mass. The resulting supported catalyst had a dispersity of metallic palladium of 69%.

Nuclear Hydrogenation Reaction (1) 25 g of MIB and 1.0 g of the 0.1% by mass Pd/ZrO$_2$ catalyst were charged in a 200-mL autoclave, which was increased in pressure and temperature to a hydrogen pressure of 9 MPa and a temperature of 200° C. Thereafter, while maintaining a hydrogen pressure of 9 MPa and a temperature of 200° C., 75 g of a raw material solution (a 10% by mass MS600-MIB solution), which was obtained by dissolving 7.5 g of a copolymer "MS600" shown in Example 1 in 67.5 g of MIB, was fed to the autoclave at a rate of 1.5 g/hour in terms of the copolymer per unit mass (g) of the supported catalyst. After completing the feeding operation, the solution was stirred for further 15 hours.

(2) After completing the reaction, the temperature and the pressure of the system were decreased, and 75 g of the reaction mixed solution (except for the supported catalyst), which corresponded to 75% by mass of the total solution, was taken out through a filter in a reaction vessel and added dropwise into an excessive amount of methanol, followed by recovering the hydrogenated polymer. The resulting hydrogenated polymer had a nuclear hydrogenation rate of 99.0%.

Subsequently, the autoclave was again increased in pressure and temperature to a hydrogen pressure of 9 MPa and a temperature of 200° C., and similar to the above manner, 75 g of the raw material solution (i.e., the 10% by mass MS600-MIB solution) was fed to the autoclave at a rate of 1.5 g/hour in terms of the copolymer per unit mass (g) of the supported catalyst, and after completing the feeding operation, the solution was stirred for further 15 hours.

The results obtained upon performing the operation (2) repeatedly 11 times in total in the similar manner as above are shown in Table 6.

No elution of palladium was found (0.01 ppm or less) in the reaction solutions in the operations.

Heat-molded articles of the resulting hydrogenated polymers each had a total light transmittance of from 91 to 92%.

TABLE 6

| Repetition number | Nuclear hydrogenation rate (%) |
|---|---|
| 0 | 99.0 |
| 1 | 99.5 |
| 2 | 99.1 |
| 3 | 98.6 |
| 4 | 97.1 |
| 5 | 95.1 |
| 6 | 93.6 |
| 7 | 92.7 |
| 8 | 91.1 |
| 9 | 89.3 |
| 10 | 88.2 |
| 11 | 86.5 |

Comparative Example 4

The experiment was performed in the same manner as in Example 3 except that the feeding rate of the raw material solution of 1.5 g/hour in terms of the copolymer per unit mass (g) of the supported catalyst in Example 3 was changed to 90 g/hour.

The results obtained upon performing the operation (2) repeatedly 7 times in total are shown in Table 7. A heat-molded articles of the hydrogenated polymers obtained in the 7th operation had a total light transmittance decreased to 84%.

TABLE 7

| Repetition number | Nuclear hydrogenation rate (%) |
|---|---|
| 0 | 97.0 |
| 1 | 94.1 |
| 2 | 90.3 |
| 3 | 86.5 |
| 4 | 81.7 |
| 5 | 77.1 |
| 6 | 73.0 |
| 7 | 68.8 |

Example 4

Preparation of Supported Palladium Catalyst 0.0527 g (0.235 mmol) of palladium acetate was dissolved in 30 g of acetone, and 4.975 g of a dried aluminum oxide carrier "GB-01" (a trade name, produced by Mizusawa Industrial Chemicals, Ltd.) was added thereto and impregnated therewith at 40° C. under stirring. After distilling off acetone at 60° C. under reduced pressure, the mixture was dried at 120° C. for 4 hours and further baked at 400° C. for 3 hours to prepare a $Pd/Al_2O_3$ catalyst having a palladium content of 0.5% by mass. The resulting supported catalyst had a dispersity of metallic palladium of 79%.

Nuclear Hydrogenation Reaction (1) 25 g of MIB and 2.0 g of the 0.5% by mass $Pd/Al_2O_3$ catalyst were charged in a 200-mL autoclave, which was increased in pressure and temperature to a hydrogen pressure of 9 MPa and a temperature of 200° C. Thereafter, while maintaining a hydrogen pressure of 9 MPa and a temperature of 200° C., 75 g of a raw material solution (a 10% by mass MS600-MIB solution), which was obtained by dissolving 7.5 g of a copolymer "MS600" shown in Example 1 in 67.5 g of MIB, was fed to the autoclave at a rate of 0.75 g/hour in terms of the copolymer per unit mass (g) of the supported catalyst. After completing the feeding operation, the solution was stirred for further 15 hours.

(2) After completing the reaction, the temperature and the pressure of the system were decreased, and 75 g of the reaction mixed solution (except for the supported catalyst), which corresponded to 75% by mass of the total solution, was taken out through a filter in a reaction vessel and added dropwise into an excessive amount of methanol, followed by recovering the hydrogenated polymer. The resulting hydrogenated polymer had a nuclear hydrogenation rate of 99.0%.

Subsequently, the autoclave was again increased in pressure and temperature to a hydrogen pressure of 9 MPa and a temperature of 200° C., and similar to the above manner, 75 g of the raw material solution (i.e., the 10% by mass MS600-MIB solution) was fed to the autoclave at a rate of 0.75 g/hour in terms of the copolymer per unit mass (g) of the supported catalyst, and after completing the feeding operation, the solution was stirred for further 15 hours.

The results obtained upon performing the operation (2) repeatedly twice in total in the similar manner as above are shown in Table 8.

No elution of palladium was found (0.01 ppm or less) in the reaction solutions in the operations.

Heat-molded articles of the resulting hydrogenated polymers each had a total light transmittance of 91%.

TABLE 8

| Repetition number | Nuclear hydrogenation rate (%) |
|---|---|
| 0 | 99.0 |
| 1 | 99.1 |
| 2 | 98.5 |

Comparative Example 5

The experiment was performed in the same manner as in Example 4 except that the feeding rate of the raw material solution of 0.75 g/hour in terms of the copolymer per unit mass (g) of the supported catalyst in Example 4 was changed to 90 g/hour.

The results obtained upon performing the operation (2) repeatedly twice in total are shown in Table 9.

A heat-molded article of the hydrogenated polymers obtained in the 0th operation had a total light transmittance decreased to 91%, and it was 90% for the 1st operation, but was decreased to 85% in the 2nd operation.

TABLE 9

| Repetition number | Nuclear hydrogenation rate (%) |
|---|---|
| 0 | 99.0 |
| 1 | 97.3 |
| 2 | 94.0 |

It is understood from the above results that a hydrogenated polymer having high transparency can be produced safely and stably over a prolonged period of time according to the production method of the present invention (see Examples 1 to 4).

It is understood that in the case where the feeding rate of the raw material solution exceeds 15 g/hour in terms of the copolymer per unit mass (g) of the supported palladium catalyst (Comparative Examples 1, 2, 4 and 5), on the other hand, a hydrogenated polymer cannot be produced stably over a prolonged period of time, and the polymer has a lowered total light transmittance and thus cannot be applied to a purpose of an optical material.

It is understood from Comparative Example 3 that in the case where such an operation is performed that the reaction mixed solution obtained in the operation (1) is wholly taken out for providing a hydrogenated polymer, and the nuclear hydrogenation reaction is performed repeatedly with the same supported catalyst, the nuclear hydrogenation rate is severely decreased after performing only once or twice the reaction.

INDUSTRIAL APPLICABILITY

A nuclear-hydrogenated aromatic vinyl compound-(meth) acrylate copolymer obtained by the present invention exhibits high transparency, low birefringence, high heat resistance, high surface hardness, low water absorbing property, low specific gravity, high transferring property and excellent mold releasing property, and in particular, it has excellent characteristics as an optical material and can be applied to a wide range of purposes, such as an optical lens, a light guide plate, a light diffusion plate, a material for a optical disk substrate and a front panel.

The invention claimed is:
1. A production method of a hydrogenated polymer by hydrogenating aromatic rings of an aromatic vinyl compound-(meth)acrylate copolymer, in which (1) a solvent solution of the copolymer is added to a reactor, which has a solvent and a supported palladium catalyst charged therein, under a hydrogen atmosphere at a rate of from 0.01 to 15 g/hour in terms of the copolymer per unit mass (g) of the supported palladium catalyst, thereby performing hydrogenation reaction, and then such an operation is performed repeatedly that (2) 30 to 90% by mass of the resulting reaction mixed solution is taken out from the reactor, a hydrogenated polymer is obtained from the reaction mixed solution which is taken out from the reactor, and a fresh solvent solution of the copolymer is added to the reactor, in which the residual reaction mixed solution is left, at a rate of from 0.01 to 15 g/hour in terms of the copolymer per unit mass (g) of the supported palladium catalyst, or the total of the resulting reaction mixed solution is taken out from the reactor, a hydrogenated polymer is obtained from 30 to 90% by mass of the reaction mixed solution which is taken out from the reactor, and a fresh solvent solution of the copolymer is added to the reactor, to which the residual reaction mixed solution is returned, at a rate of from 0.01 to 15 g/hour in terms of the copolymer per unit mass (g) of the supported palladium catalyst, thereby performing hydrogenation reaction.

2. The production method of a hydrogenated polymer according to claim 1, wherein the hydrogenation is performed at a reaction temperature of from 150 to 250° C. and a hydrogen pressure of from 5 to 15 MPa.

3. The production method of a hydrogenated polymer according to claim 1, wherein a total concentration of the copolymer and the hydrogenated polymer at the time when the addition of the solvent solution of the copolymer is finished is from 1 to 40% by mass.

4. The production method of a hydrogenated polymer according to claim 1, wherein after finishing the addition of the solvent solution of the copolymer, the reaction mixed solution is stirred for from 0.1 to 24 hours.

5. The production method of a hydrogenated polymer according to claim 1, wherein in constitutional units of the copolymer, a molar ratio of a constitutional unit derived from the (meth)acrylate is from 0.25 to 4 based on a constitutional unit derived from the aromatic vinyl compound.

6. The production method of a hydrogenated polymer according to claim 1, wherein the copolymer has a weight average molecular weight of from 10,000 to 1,000,000.

7. The production method of a hydrogenated polymer according to claim 1, wherein a hydrogenation rate of aromatic rings is 70% or more.

8. The production method of a hydrogenated polymer according to claim 1, wherein the aromatic vinyl compound is styrene, and the (meth)acrylate contains from 80 to 100% by mol of methyl methacrylate and from 0 to 20% by mol of an alkyl acrylate.

9. The production method of a hydrogenated polymer according to claim 1, wherein a carrier of the supported palladium catalyst is zirconium oxide and/or aluminum oxide.

10. The production method of a hydrogenated polymer according to claim 1, wherein the supported palladium catalyst has a palladium content of from 0.01 to 5% by mass.

11. The production method of a hydrogenated polymer according to claim 1, wherein the solvent is a carboxylate ester.

12. The production method of a hydrogenated polymer according to claim 1, wherein the reaction mixed solution obtained in the operation (1) is taken out from the reactor, at which the supported palladium catalyst is separated and left in the reaction system.

13. A hydrogenated polymer obtained by the production method according to claim 1.

14. An optical material composition comprising the hydrogenated polymer according to claim 13.

15. The production method of a hydrogenated polymer according to claim 1, wherein the operation performed repeatedly comprises taking out from the reactor 30 to 90% of mass of the resulting reaction mixed solution, obtaining a hydrogenated polymer from the reaction mixed solution which is taken out from the reactor, and adding fresh solvent solution to the reactor.

16. The production method of a hydrogenated polymer according to claim 1, wherein the operation performed repeatedly comprises taking the total amount of the resulting reaction mixed solution out from the reactor, obtaining a hydrogenated polymer from 30 to 90% by mass of the reaction mixed solution which is taken out from the reactor, and adding the fresh solvent solution to the reactor to which the residual reaction mixed solution is returned.

17. The production method of a hydrogenated polymer according to claim 1, wherein for each operation the copolymer is completely added to the reactor before the reaction mixed solution is taken out from the reactor.

18. The production method of a hydrogenated polymer according to claim 1, wherein, before the reaction mixed solution is taken out from the reactor, the hydrogenation reaction is completed and a pressure of the hydrogen atmosphere in the reactor is decreased.

19. A method for hydrogenating the aromatic rings of an aromatic vinyl compound-(meth)acrylate copolymer to form a hydrogenated polymer, comprising:

adding a solvent solution of the copolymer, a solvent and a supported palladium catalyst to a reactor, hydrogenating the copolymer under a hydrogen atmosphere at a rate of from 0.01 to 15 g/hour in terms of the copolymer per unit mass (g) of the supported palladium catalyst to form a reaction mixed solution comprising the hydrogenated copolymer, then carrying out at least one of the following two operations more than once:

(i) removing 30 to 90% by mass of the reaction mixed solution from the reactor; adding a fresh solvent solution of the copolymer to the reactor in which 10-70% by mass of the reaction mixed solution remains, and then hydrogenating the copolymer present in the reactor at a rate of from 0.01 to 15 g/hour in terms of the copolymer per unit mass (g) of the supported palladium catalyst, (ii) removing the total amount of the reaction mixed solution from the reactor, adding a fresh solvent solution of the copolymer to the reactor from which the reaction mixed solution has been removed, adding 70 to 10% by mass of the reaction mixed solution removed from the reactor back into the reactor containing the fresh solvent solution of the copolymer, and then hydrogenating the copolymer present in the reactor at a rate of from 0.01 to 15 g/hour in terms of the copolymer per unit mass (g) of the supported palladium catalyst.

* * * * *